(12) United States Patent
Hopf

(10) Patent No.: US 12,214,397 B2
(45) Date of Patent: Feb. 4, 2025

(54) VEHICLE BODY ELEMENT DENT SYSTEM AND METHOD

(71) Applicant: Steven Hopf, Riverside, CA (US)

(72) Inventor: Steven Hopf, Riverside, CA (US)

( * ) Notice: Subject to any disclaimer, the term of this patent is extended or adjusted under 35 U.S.C. 154(b) by 287 days.

(21) Appl. No.: 17/939,514

(22) Filed: Sep. 7, 2022

(65) Prior Publication Data

US 2024/0075512 A1 Mar. 7, 2024

(51) Int. Cl.
| | | |
|---|---|---|
| *G09B 9/00* | (2006.01) | |
| *B21D 1/06* | (2006.01) | |
| *B21D 31/06* | (2006.01) | |
| *G09B 19/24* | (2006.01) | |

(52) U.S. Cl.
CPC .............. *B21D 1/06* (2013.01); *B21D 31/06* (2013.01); *G09B 9/00* (2013.01); *G09B 19/24* (2013.01); *Y10S 72/705* (2013.01)

(58) Field of Classification Search
CPC . B21D 1/06; B21D 1/065; B21D 1/10; B21D 1/12; B21D 3/10; B21D 3/14; B21D 31/06; Y10S 72/705
USPC ..................... 72/705; 73/11.01, 11.02, 11.03
See application file for complete search history.

(56) References Cited

U.S. PATENT DOCUMENTS

| | | | |
|---|---|---|---|
| 974,450 A | 11/1910 | Tully | |
| 2,148,943 A * | 2/1939 | Hauschild | ................ B21D 1/06 72/434 |
| 3,088,513 A | 5/1963 | Marquardt | |
| 3,757,562 A | 9/1973 | Goldberg et al. | |
| 4,116,035 A | 9/1978 | Malarsky | |
| 5,373,749 A | 12/1994 | Strand et al. | |
| 5,483,845 A | 1/1996 | Stein et al. | |
| 5,485,758 A | 1/1996 | Brown et al. | |
| 5,623,094 A | 4/1997 | Song et al. | |
| 5,641,917 A | 6/1997 | Hurite et al. | |
| 5,861,544 A | 1/1999 | Kosaraju et al. | |
| 5,872,321 A | 2/1999 | Yannaccone | |

(Continued)

*Primary Examiner* — Jared O Brown

(57) ABSTRACT

A vehicle body dent system may include a dent impactor, which may include a ram and an impactor head on one end of the ram. The ram may be adapted to accelerate the impactor head to forcefully make contact with a vehicle body element, thereby denting the vehicle body element. The impactor head may be replaceable on the ram. Different impactor heads of numerous shapes and sizes may be provided. The ram may be a pneumatic cylinder, as such the criteria of a dent may be the classification of the impactor head used, such as the diameter of the impactor head, and the air pressure provided to the cylinder which may comprise the ram. The vehicle body element may be supported by a body element support, which may include a rotating portion. The body element support may include a mounting element in the form of a body element table, or one or more standoffs, movably mounted to the body element support. The mounting element may be adapted to receive the vehicle body element and securely support the vehicle body element. The mounting element may be coupled to the rotating portion of the body element support so that the vehicle body element mounted to the body element support may be positioned substantially horizontal or substantially vertical that may represent the position of the vehicle body element as if it were on a vehicle where a technician can be trained to remove the dent.

18 Claims, 11 Drawing Sheets

(56) References Cited

U.S. PATENT DOCUMENTS

| | | | |
|---|---|---|---|
| 5,922,937 | A | 7/1999 | Kowalski et al. |
| 5,929,348 | A | 7/1999 | Stein et al. |
| 6,178,805 | B1 | 1/2001 | Kosaraju et al. |
| 6,609,409 | B1 | 8/2003 | Bock et al. |
| 6,871,525 | B2 | 3/2005 | Withnall et al. |
| 9,033,407 | B2 | 5/2015 | Ikeda et al. |
| 10,436,690 | B2 | 10/2019 | Taylor et al. |
| 10,444,099 | B2 | 10/2019 | Sicking |
| 11,054,323 | B2 | 7/2021 | Yand et al. |
| 11,255,765 | B2 | 2/2022 | Brandt |
| 2005/0155441 | A1 | 7/2005 | Nagata |
| 2008/0016970 | A1 | 1/2008 | Klein |
| 2014/0212852 | A1* | 7/2014 | Spencer .................. G09B 19/24 108/1 |
| 2015/0369694 | A1 | 12/2015 | Neale et al. |
| 2020/0342784 | A1* | 10/2020 | Hopf ...................... G09B 19/24 |

\* cited by examiner

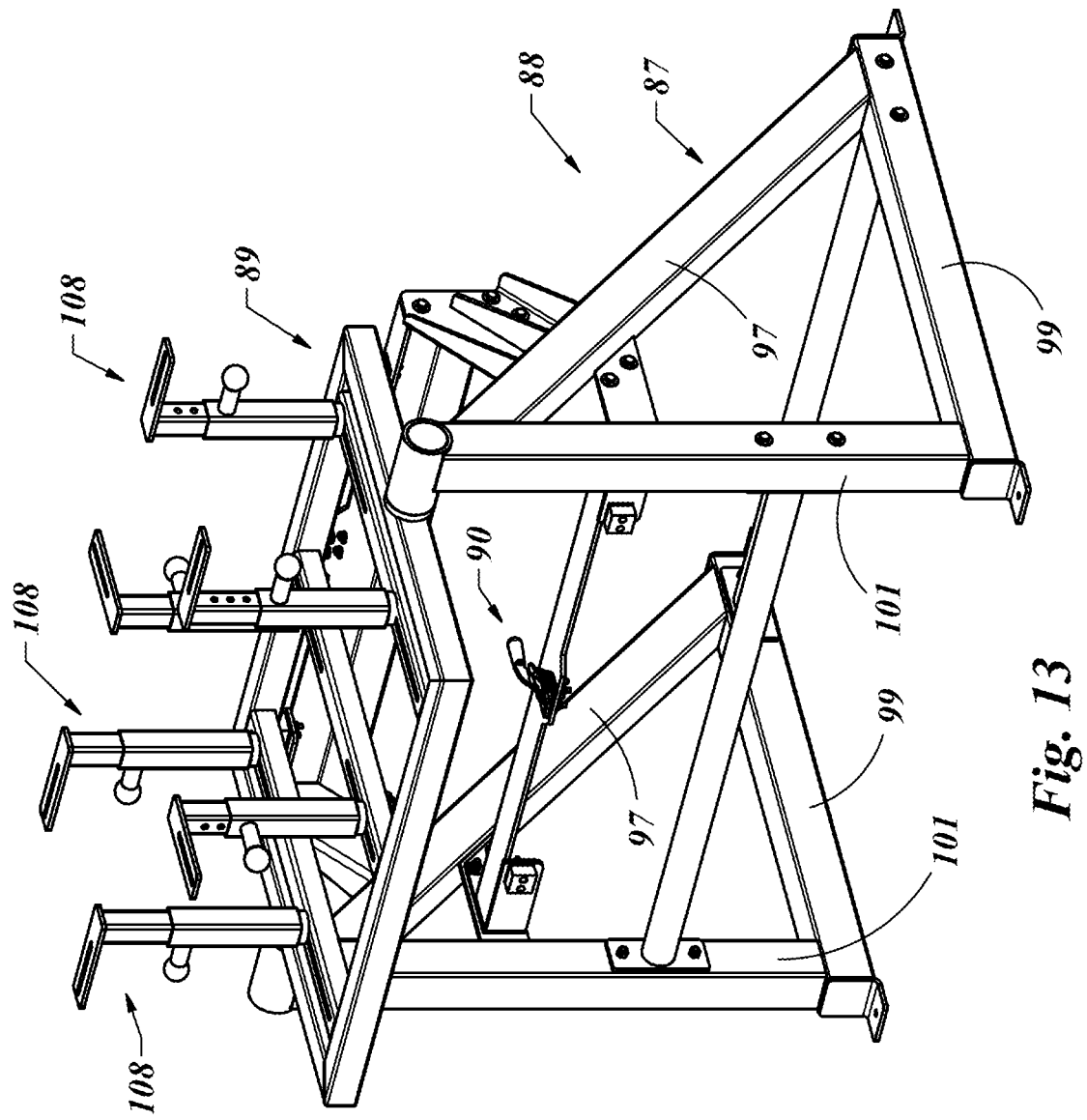
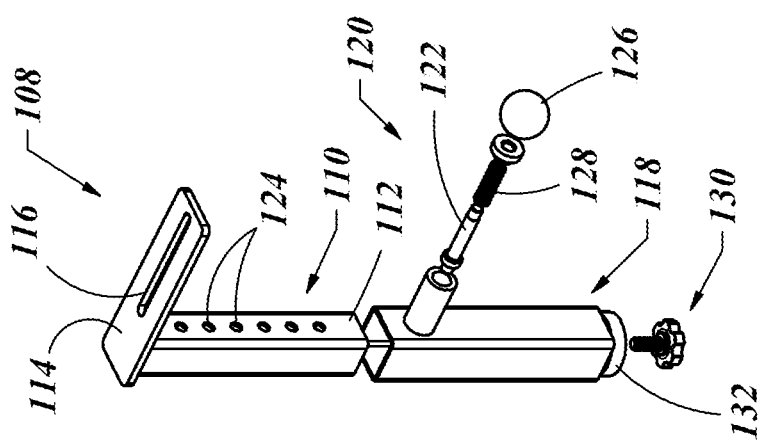
Fig. 13
Fig. 12

VEHICLE BODY ELEMENT DENT SYSTEM AND METHOD

FIELD OF THE INVENTION

The present invention generally relates to vehicle dent removal systems and teaching systems to provide standardized testing materials for same.

BACKGROUND OF THE INVENTION

All testing procedures need to have a consistent test to provide a valid evaluation of the knowledge and/or skill of the student being tested. A math teacher does not give a harder test to some students and an easier test to other students in the same class. Not only would that be grossly unfair, but it would not do justice to the testing process as the bar of evaluation needs to consistent, regardless of the test taker.

Many trades have tests involving physical performance of the tasks for which the student is being evaluated. Paintless dent removal (PDR) is no different in that students are taught techniques which need to be practiced and perfected. Certification programs may be important in that certifications may provide a consistent basis for evaluation of different levels of proficiency in PDR. For example, a Level 1 technician may be competent to remove a certain number of dents to a desired level relative to a "pre-dented" body part in a certain amount of time. Likewise, a Level 2 technician may be able to remove a higher number of dents, some or all of which may have a higher degree of difficulty or deformation relative to the same pre-dented condition in a set amount of time. Any number of levels may be designated according to the needs of the industry.

For any testing to be of value, the testing protocols and procedures must be reliable, repeatable and consistent. There are three factors which must be controlled to achieve this, the first factor is test time. That is the easiest of the factors in that the time allowed to take the exam must be consistent for all people taking that particular test. The testing time for different levels may vary, but all Level 1 tests must be the same duration, as so must all Level 2 tests, but the duration of a Level 1 test may differ from the time allowed for a Level 2 test.

The second factor is the panel of the test itself meaning, in this case, the pre-dented vehicle body elements. The number of dents and extent of those dents must be consistent within each testing level. Until now, the vehicle body elements used could vary greatly in the size, depth and location of the dents. These various vehicle body elements would be randomly distributed to different students to remove these dents to an acceptable level within a certain time frame. When the test itself has significant inconsistencies regarding degree of difficulty, there is a real issue with maintaining testing integrity. A high school algebra teacher cannot give one student a test based on arithmetic and another based on three-dimensional calculus in the same class. Neither of those two tests would adequately evaluate the students' proficiency in algebra. Not only that, the student that is tested below the level of the class would likely pass the class, possibly without mastering the content of the class, whereas the student that was tested over the level of the class would likely fail even though that student may be proficient in the information presented in the class. The tests must be consistent in level of difficulty and amount of time needed to complete the test, though the tests themselves need not necessarily be identical.

A second piece of the testing panel, is the grading of the tests. The grading of the tests must be consistent from one student to the next. So often tests are graded based on subjective criteria. In some disciplines there is no other way to grade a test. Until now, the evaluation of PDR testing for the most part fell under a subjective level of what is considered "repaired". The present invention provides a solution not only to eliminate subjective evaluation for testing, but also for evaluation of repaired parts in the field. This process may allow for more accurate estimation of the cost of repair and provide a consistent metric for measuring the level of repair where a standard is established for what is considered "repaired".

The third factor falls under the conditions for testing. Similar lighting and reasonable room temperature must be maintained. This is relatively easily controlled by requiring an indoor testing facility that is reasonably climate controlled. It would not be fair to have some students test in 100-degree (F) heat and others in freezing conditions.

In addition, the support for the vehicle body elements as they are being worked on is also critical to be maintained. The present invention provides a tilt table, or body element support, that securely supports the vehicle body element and allows more than one orientation of the vehicle body element relative to the floor. This enables a better true to life representation of positioning the body part in space as it may be provided if still on a vehicle. As a significant number of vehicle body elements will be repaired on the vehicle, this is a critical factor to test the abilities of the student.

It should, therefore, be appreciated that there is a need for a standardized dent removal testing processes for vehicles which may include uniform dent and dent patterns in vehicle body parts as well as a secure table that is adapted to simulate the body part being on a vehicle. The present invention fulfills this need and others.

SUMMARY OF THE INVENTION

The present invention may include a dent impactor, which may include a ram and an impactor head on one end of the ram. The ram may be adapted to accelerate the impactor head to forcefully make contact with a vehicle body element, thereby denting the vehicle body element. The impactor head may be replaceable on the ram. Different impactor heads of numerous shapes and sizes may be provided. The impactor head may include a pliable outer surface, such as a rubber, so as to reduce the likelihood of scratching the paint on the vehicle body element when the impactor head makes contact with the vehicle body element.

The ram may be a pneumatic cylinder, as such the criteria of a dent may be the classification of the impactor head used, such as the diameter of the impactor head, and the air pressure provided to the cylinder which may comprise the ram. With all other variables remaining constant, the cylinder pressure will positively affect the speed and force for which the impactor head hits the vehicle body element and the classification of the impactor head will be consistent with the overall size and shape of the dent. Therefore, for example, a designation of "Impactor Head #2 @ 75 p.s.i." should always produce a consistent dent in a constantly constructed vehicle body element.

The impactor may be movably positioned by way of a dent impactor cart, whereby the impactor head may be aligned with specific locations on the vehicle body element. The impactor may be movably positioned on the movable cart so that a frame supporting the impactor may be lowered to touch the vehicle body element, thus providing consistent height of the impactor head relative to the vehicle body element.

The vehicle body element may be supported by a body element support, which may include a rotating portion. The body element support may include a mounting element in the form of a body element table, or one or more standoffs, movably mounted to the body element support. The mounting element may be adapted to receive the vehicle body element and securely support the vehicle body element. The mounting element may be coupled to the rotating portion of the body element support so that the vehicle body element mounted to the body element support may be positioned substantially horizontal or substantially vertical. In addition, the vehicle body element may be moved linearly relative to the rotating portion of the body element support, thereby allowing the vehicle body element to further adjust at least vertically or horizontally relative to the body element support.

The current invention may also include a method including providing all of the elements used in the impactor, body element support and mounting element and also providing a vehicle body element positioned on the body element support and positioned in a horizontal orientation. The impactor may include an impactor head on the ram of the impactor and charging the ram to a specific level of potential energy. The method may also include lowering the dent impactor so a frame base of the dent impactor is adjacent to the vehicle body element at which time the ram may be released causing the impactor head to strike the vehicle body element, creating a dent of a repeatable size and depth in the vehicle body element, thus creating a conditioned vehicle body element. The method may further include removing the impactor from the immediate area of the vehicle body element and using the conditioned vehicle body element as test material to evaluate the skill of a user tasked with removing the dent in the conditioned vehicle body element while still coupled to the body element support.

For purposes of summarizing the invention and the advantages achieved over the prior art, certain advantages of the invention have been described herein. Of course, it is to be understood that not necessarily all such advantages can be achieved in accordance with any particular embodiment of the invention. Thus, for example, those skilled in the art will recognize that the invention can be embodied or carried out in a manner that achieves or optimizes one advantage or group of advantages as taught herein without necessarily achieving other advantages as may be taught or suggested herein.

All of these embodiments are intended to be within the scope of the invention herein disclosed. These and other embodiments of the present invention will become readily apparent to those skilled in the art from the following description of the preferred embodiments and drawings, the invention not being limited to any particular preferred embodiment(s) disclosed.

BRIEF DESCRIPTION OF THE DRAWINGS

Embodiments of the present invention will now be described, by way of example only, with reference to the following drawings, in which:

FIG. 12 is a disassembled, isometric view of an alternative embodiment to the body element table in the form of an individual adjustable standoff.

FIG. 13 is and isometric view of the body element support of FIG. 11 where the body element table has been replaced with more than one adjustable standoff.

DETAILED DESCRIPTION OF THE INVENTION

Figure 1:
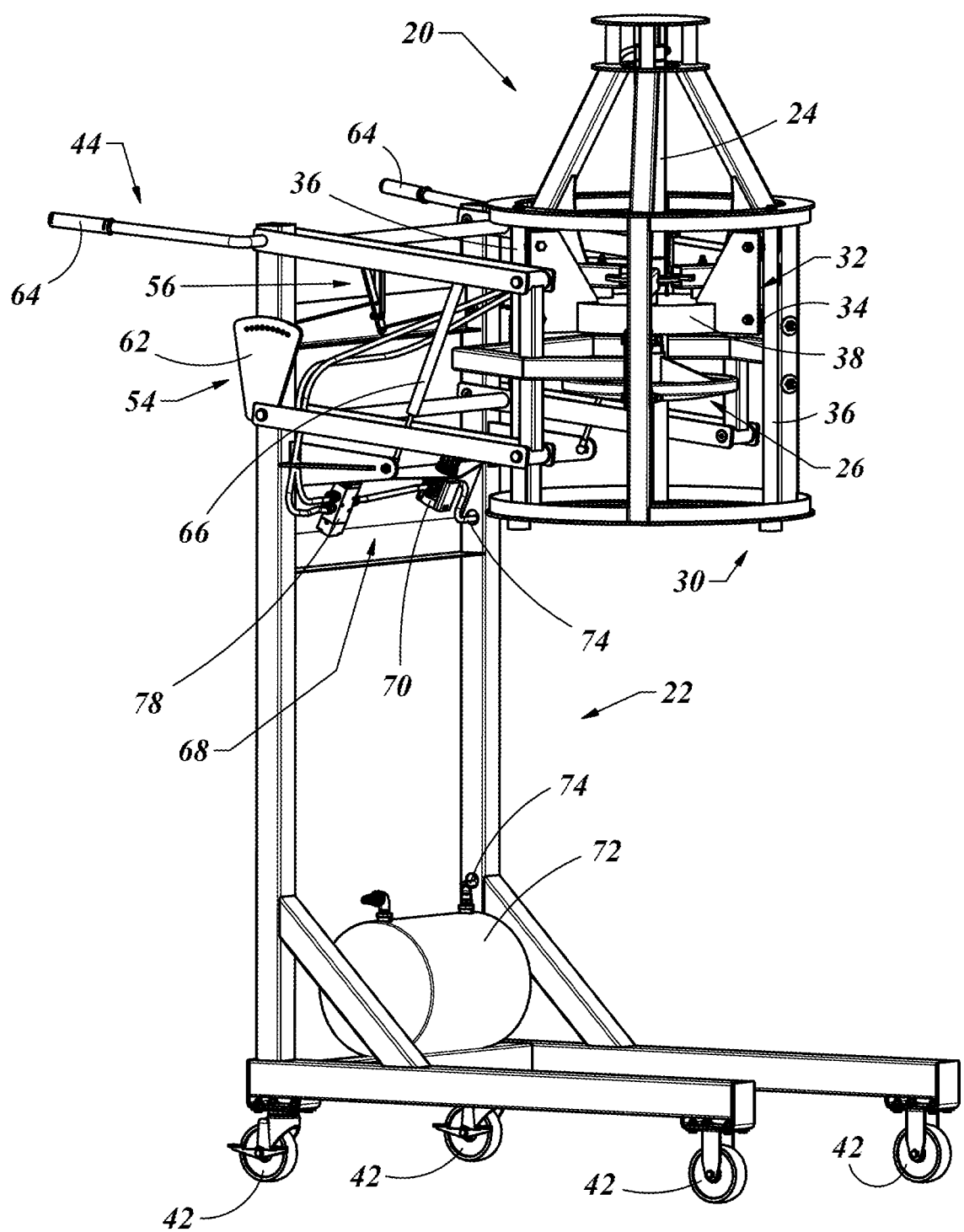
FIG. 1 is a right front view of a dent impactor movably mounted on a dent impactor cart, presented in accordance with the present invention.
Figure 2:
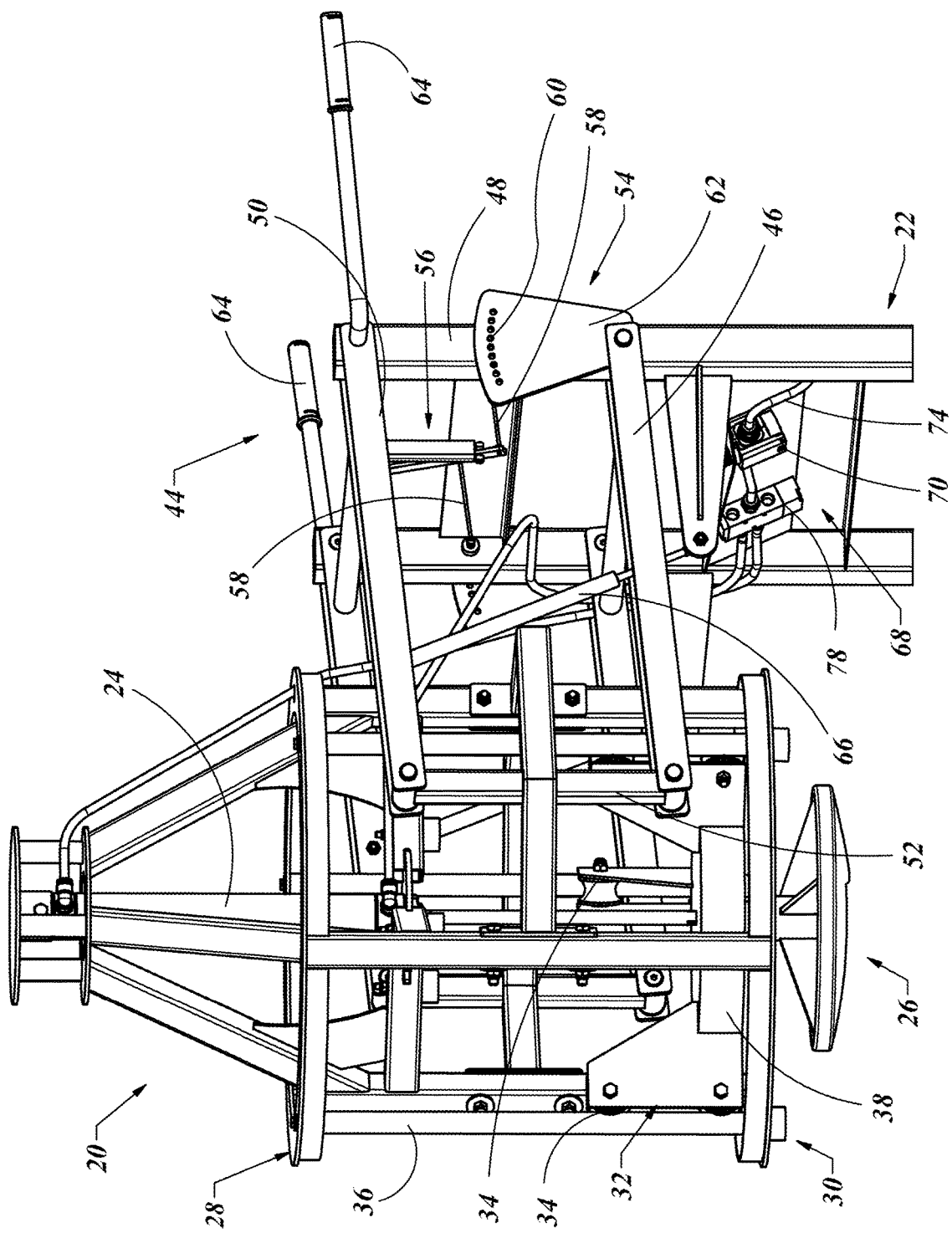
FIG. 2 is a partial detail view of the dent impactor presented in FIG. 1, with the impactor head in an extended position.
Figure 3:
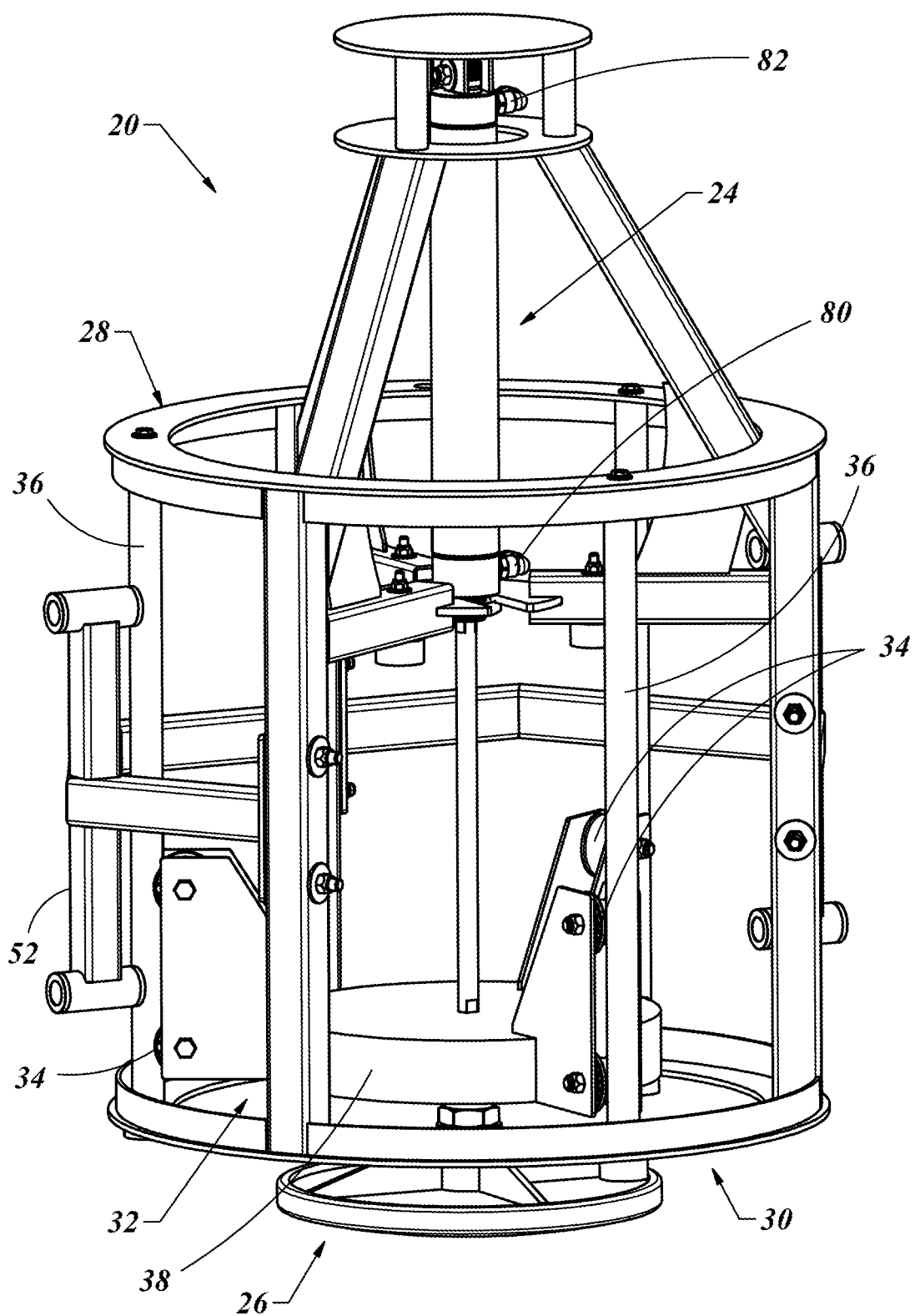
FIG. 3 is an elevated side view of the dent impactor as presented in FIG. 2.
Figure 4:
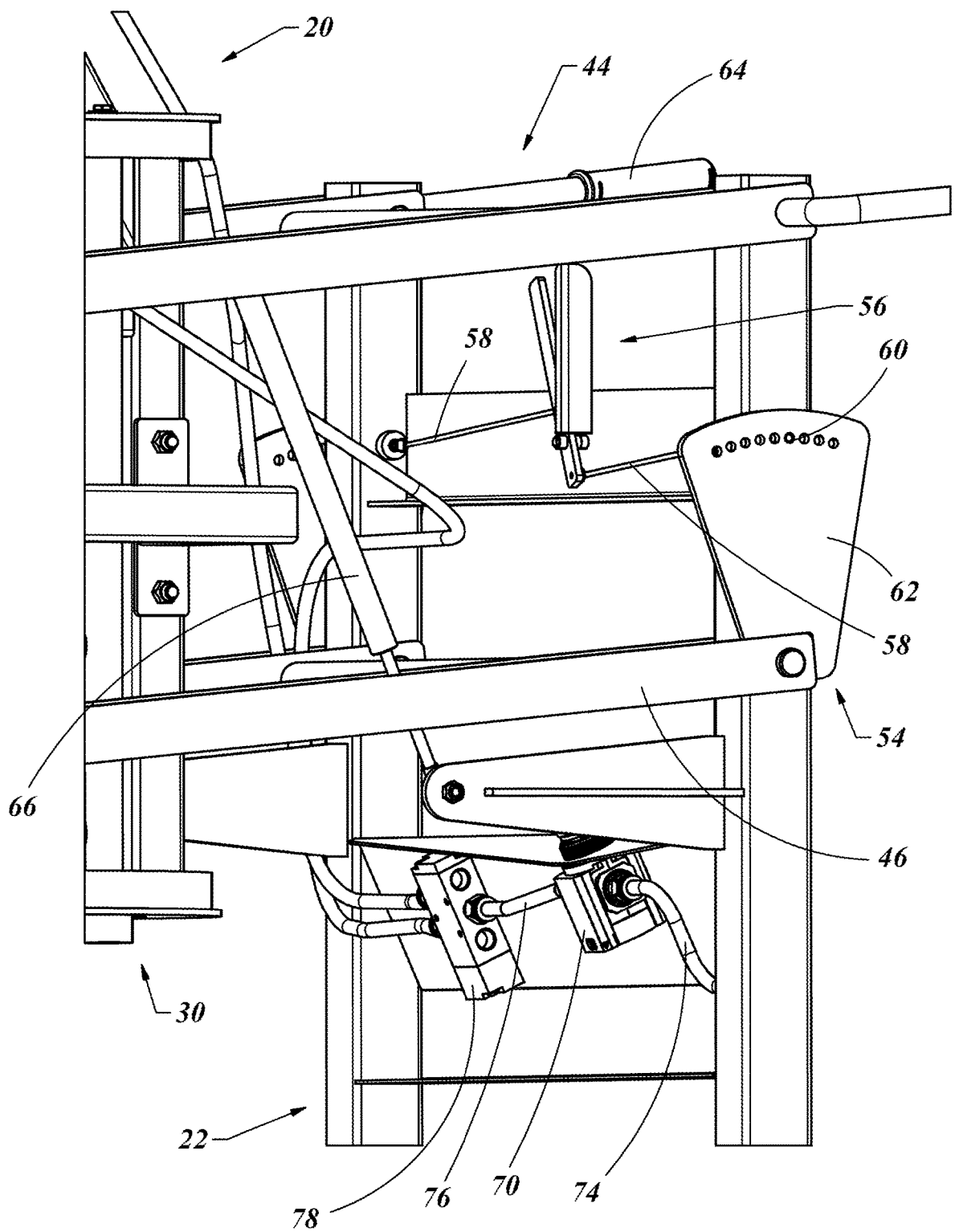
FIG. 4 is a side partial view of the dent impactor and dent impactor cart showing a locking mechanism and a cylinder drive system.

With reference to the illustrative drawings and particularly to FIGS. 1-5, there is shown a vehicle body element dent standardization system, detailing a dent impactor 20 being supported by a dent impactor cart 22. The dent impactor 20 is shown in more detail in FIGS. 2-3. The dent impactor 20 may include a ram 24, which may be in the form of a pneumatic cylinder, and an impactor head 26 may be positioned on one end of the ram 24, such that as the ram 24 extends, the impactor head 26 is forcefully driven down, as is shown in FIGS. 2-3 and retracted in FIG. 1.

The dent impactor 20 may include a dent impactor frame 28. The dent impactor frame 28 may include a frame base 30. The dent impactor frame 28 may support the ram 24. As is shown, when the ram 24 is extended and the impactor head 26 is in the lower position, the impactor head 26 may extend below the frame base 30. In this way the frame base 30 may be positioned on a surface when the ram 24 is retracted and the impactor head 26 is elevated within the dent impactor frame 28. The ram 24 may then be extended, driving the impactor head 26 down and impacting any surface which the frame base 30 is positioned thereon. The result is the impactor head 26 may cause a dent in the surface on which the frame base 30 is positioned.

The ram 24 may be connected to a carriage 32, and the impactor head 26 may be releasably coupled to the carriage 32. The carriage 32 may include a plurality of guide rollers 34 which may articulate with guide rails 36, which may be part of the dent impactor frame 28. This combination may allow the carriage to consistently travel along a long axis of the dent impactor frame 28 and be supported even if side loads are applied to the impactor head 26 during impact with the surface.

The carriage 32 may also include a carriage weight 38. The carriage weight 38 may be of significant mass so that when moving downward via the ram 24, this mass may assist in providing kinetic energy to the impactor head 26 as the carriage 32 is accelerated by the ram 24. This kinetic energy may be useful in the transfer of energy from the carriage 32 to the material of the surface adjacent to the frame base 30, through the impactor head 26 to thereby dent the material of the surface near the frame base 30.

The dent impactor 20 may be movably mounted to a dent impactor cart 22. The dent impactor cart 22 may include casters 42 which may allow for the dent impactor 20 to be moved from one location to another. In addition, the dent impactor cart 22 may include a lift mechanism 44 which may allow for the dent impactor 20 to be moved vertically relative to the dent impactor cart 22. Here a 4-bar linkage 46, 48, 50 & 52 is shown to connect the dent impactor 20 to the dent impactor cart 22. Any similar linkage or support system that would allow for vertical movement of the dent impactor 20 relative to the dent impactor cart 22 may be used in this environment. An advantage to the four-bar linkage (46, 48, 50 & 52) is the dent impactor frame 28 may maintain a vertical orientation as the dent impactor frame 28 is lifted and lowered by the lift mechanism 44.

The lift mechanism 44 may include a lock 54, as it may be valuable to lock the dent impactor 20 in a set height. By locking the dent impactor 20 to the dent impactor cart 22 by way of the lock 54, the mass of the dent impactor 20 is now effectively increased to include the mass of the dent impactor cart 22. A mass of significant value of the dent impactor 20 may be desired to minimize any upward vertical displacement of the dent impactor 20 when the impactor head 26 transfers its kinetic energy to produce a dent in the material (not shown here) near the surface of the frame base 30. That impact will cause a reaction force to try to move the dent impactor 20 upward. The greater the mass of the dent impactor 20, with anything rigidly connected to it, will result in a greater transfer of energy to deform the material to be dented and not rebound the dent impactor 20 up and away from the material desired to be dented as a result of the collision of the impactor head 26 and the material to be dented. Simply put, the reaction force caused by the collision of the impactor head 26 and the material to be dented will try to accelerate the dent impactor 20 up, away from the material to be dented. This force (F) will cause a vertical acceleration of the dent impactor 20 up, in opposition to gravity and be inversely proportional to the mass of the object to be moved, which is the dent impactor 20 plus the dent impactor cart 22, when they are locked together (F=ma). The greater the mass (m), the lower the vertical acceleration (a) with any constant force (F) provided by the impact.

The lift mechanism 44 may be manipulated by squeezing the lock handle 56 which may actuate the lock bars 58 to retract the lock pins 60 from the lock plates 62. A user can then move either of the lift handles 64 to move the dent impactor 20 up or down. The weight of the dent impactor 20 may be counterbalanced by the gas springs 66. When the proper height of the dent impactor 20 is achieved, the user can release the lock handle 56, whereby the lock pins 60 may re-engage with a hole in the lock plates 62, thereby securing the dent impactor 20 at the new height.

In reference to FIGS. 2-3, the ram 24 may be a pneumatic cylinder. As such, a cylinder drive system 68 may be used to actuate the ram 24 up and down. This may include a regulator 70 which may take pressurized air from a tank 72 (FIG. 1) by way of a pressure input line 74. A pressure output line 76 may take the regulated pressurized air from the regulator 70 to a valve 78. This valve 78 may be a three-position valve, wherein a first position directs the pressurized air to a bottom port 80 of the ram 24. This pressurized air may drive an internal piston (not shown) within the ram 24 upward, thus retracting the ram 24 and moving the impactor head 26 up.

The second position of the valve 78 may be a neutral position in which all of the ports of the valve 78 are closed to air flow and thereby no air moves through the valve 78 and as such, the ram 24 doesn't extend or retract. The third position of the valve 78 may connect the pressurized air to the top port 82 on the ram 24. The valve 78 in this position allows for the bottom port 80 to exhaust through the valve 78 while gravity and the pressurized air extend the ram 24, driving the impactor head 26 down.

Figure 5:
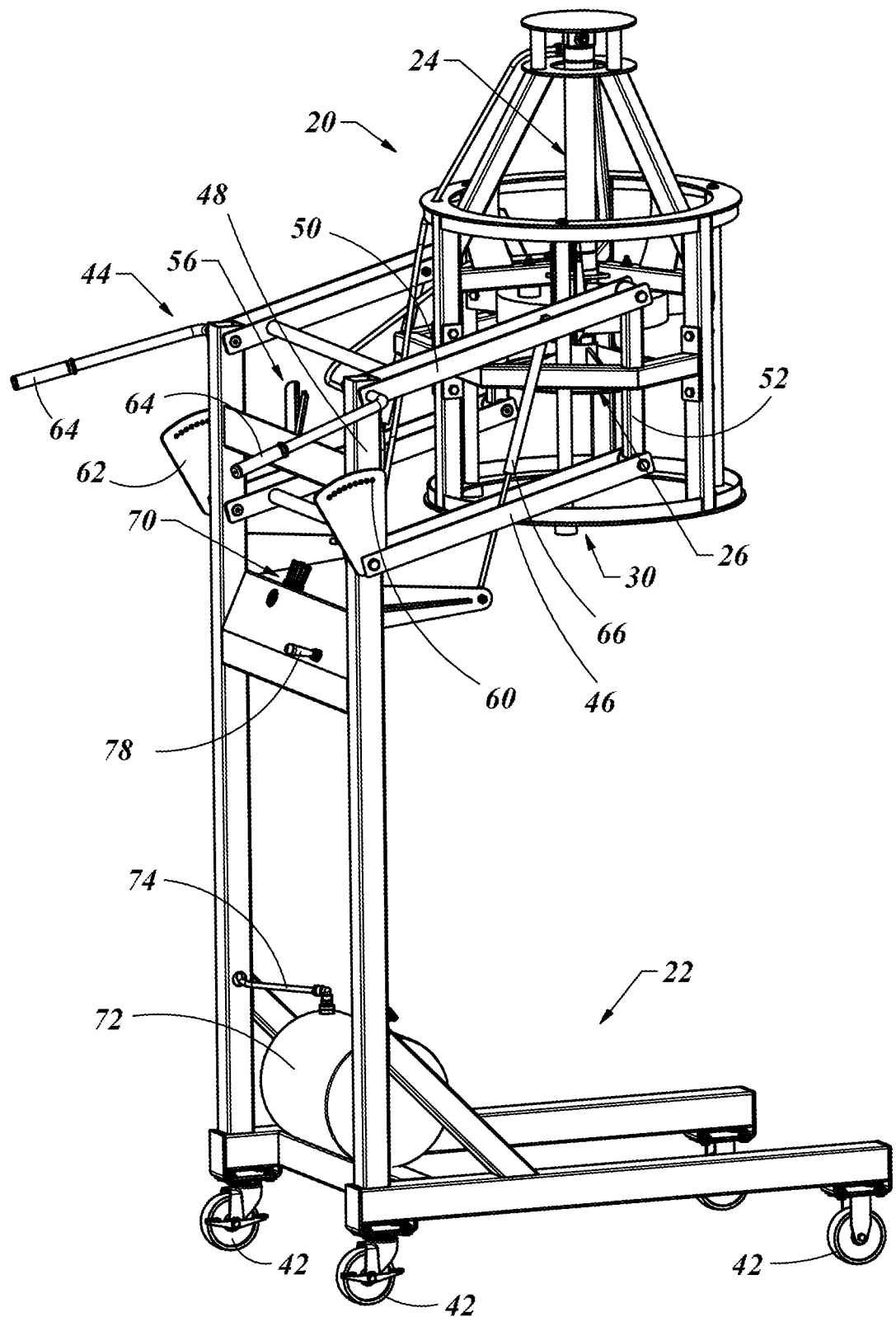
FIG. 5 is a rear right view of the dent impactor and dent impactor cart as presented in FIG. 1, here shown with the dent impactor in an elevated position on the dent impactor cart.
Figure 6:
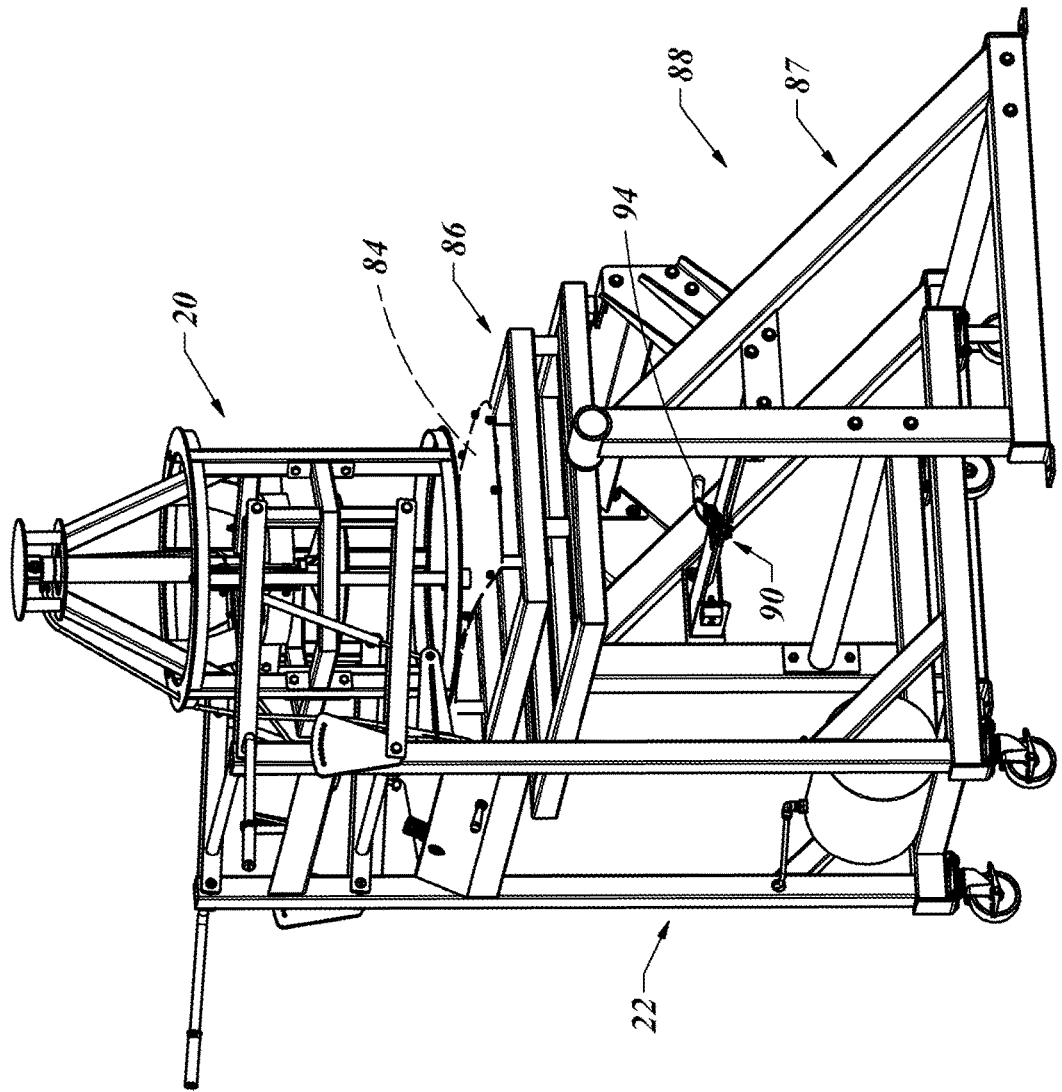
FIG. 6 is a right rear view of the dent impactor and dent impactor cart as it may be positioned relative to a vehicle body element, the vehicle body element secured to a body element support.
Figure 7:
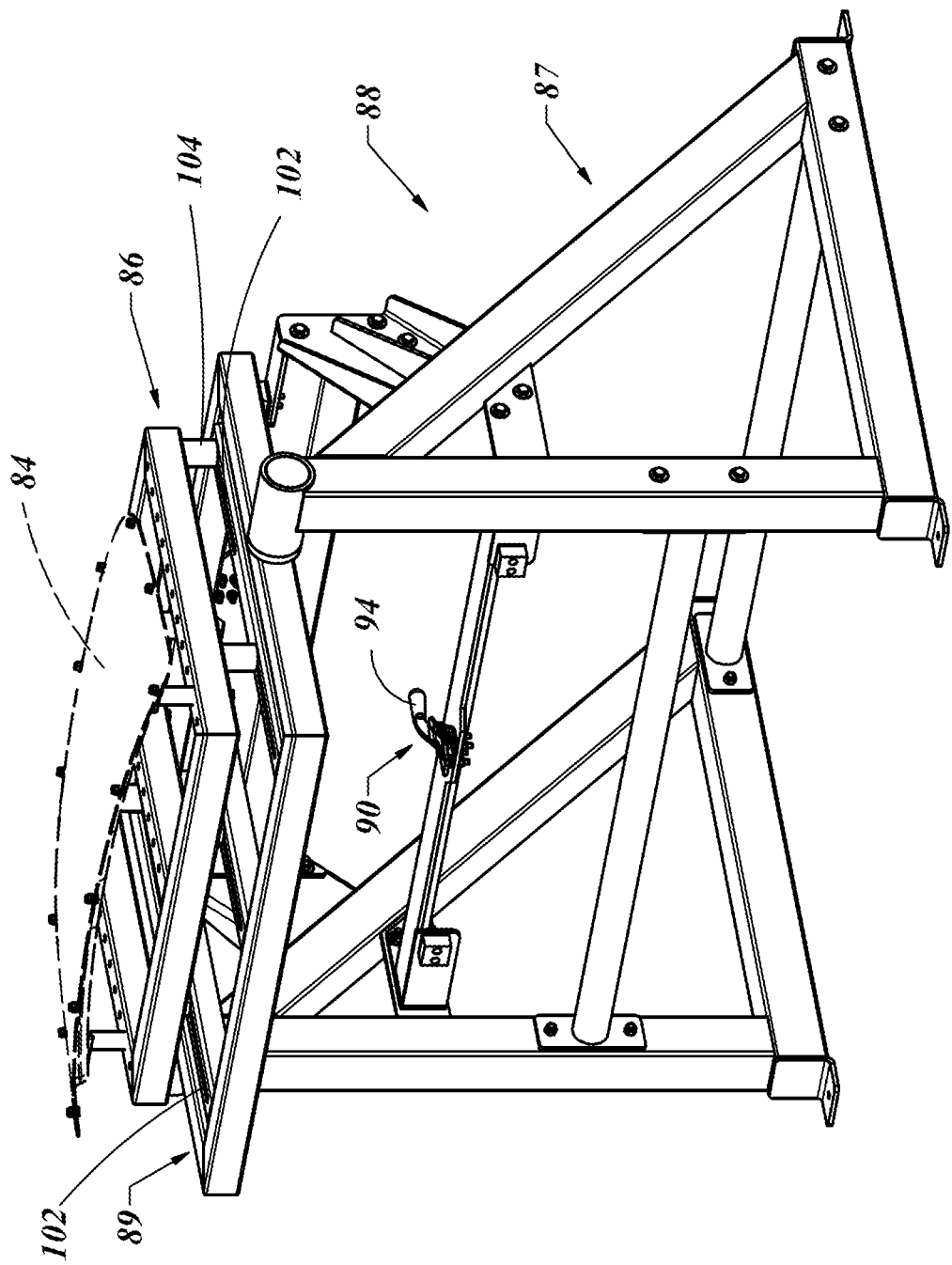
FIG. 7 is a rear right view of the body element support and vehicle body element as shown in FIG. 6.

As noted, the dent impactor 20 may need to be vertically displaced in order to position it relative to a material to be dented. The dent impactor 20 may be elevated relative to the dent impactor cart 22, as is shown in FIG. 5. In this position, the frame base 30 of the dent impactor 20 may freely move without any interference between the dent impactor 20 and any material to be dented. When the desired position of the dent impactor 20 is made relative to the material to be dented, the dent impactor 20 may be lowered such that the frame base 30 is touching or immediately adjacent to the material to be dented and then locked in that vertical position. This is illustrated in FIG. 6 where the dent impactor 20 is positioned just above a vehicle body element 84, which here is the material to be dented. The vehicle body element 84 may be releasably secured to a mounting element such as a body element table 86. The body element table 86 may be movably coupled to a body element support 88 which may include a rotating portion 89 to which the body element table 86 may be directly attached. The body element support 88 may include a support base 87 which may be used to secure the body element support 88 to a floor.

With reference to FIGS. 7-11, more detail of the body element support 88 and the body element table 86 are shown. The purpose of the body element support 88 is to provide a solid support for the vehicle body element 84 and provide a representation as if the vehicle body element 84 was a part of a vehicle. This may be a vehicle hood, side or quarter panel, door or any other portion of a vehicle body. It may be desirable to source new vehicle body elements 84, as the paint and structural integrity of these vehicle body elements 84 would be consistent from one part to the next, as noted, this may be desirable to maintain consistent testing materials for the students after these vehicle body elements 84 are conditioned by adding one or more dents to the vehicle body elements 84.

The next step is to apply consistent dents in the vehicle body elements 84 which may condition the vehicle body elements 84 by placing them in a condition which may resemble a vehicle body element 84 that has been damaged in an accident. To accomplish this, a standard may be provided that calls for the number of dents, the size and shape of the dents and finally the depth of those dents. This may be accomplished by using the dent impactor and specifying the specific impactor head 26 to be used, the air pressure of the ram 24 and how many dents of what impactor head 26 and what pressure. The product of this would be a consistent number, shape and depth of the dents for each student to be tested for the specific level of that test. A higher level of certification test may include more dents or more dramatic dents (different shapes or higher air pressure resulting in deeper dents), but again, each dented vehicle body element may be reasonably consistent from one to the next.

The dents may be applied while the vehicle body element 84 is in a horizontal position (FIG. 6). The rotation of the rotating portion 89 of the body element support 88 from a horizontal position (FIG. 7) to a vertical position (FIG. 8) may be done to better represent the typical orientation of the vehicle body element 84 on an actual vehicle. For example, if the vehicle body element 84 is an engine hood or trunk hood, the vehicle body element 84 may be desired to be positioned in a horizontal orientation, as in FIG. 7, as this is how that part would be positioned on a vehicle where the PDR technician would then remove the dents. If the vehicle body element 84 is a quarter panel or door, the vehicle body element 84 may be positioned in a vertical orientation as in FIG. 8, again to more accurately represent what a technician would encounter in the real world.

Figures 8, 9:
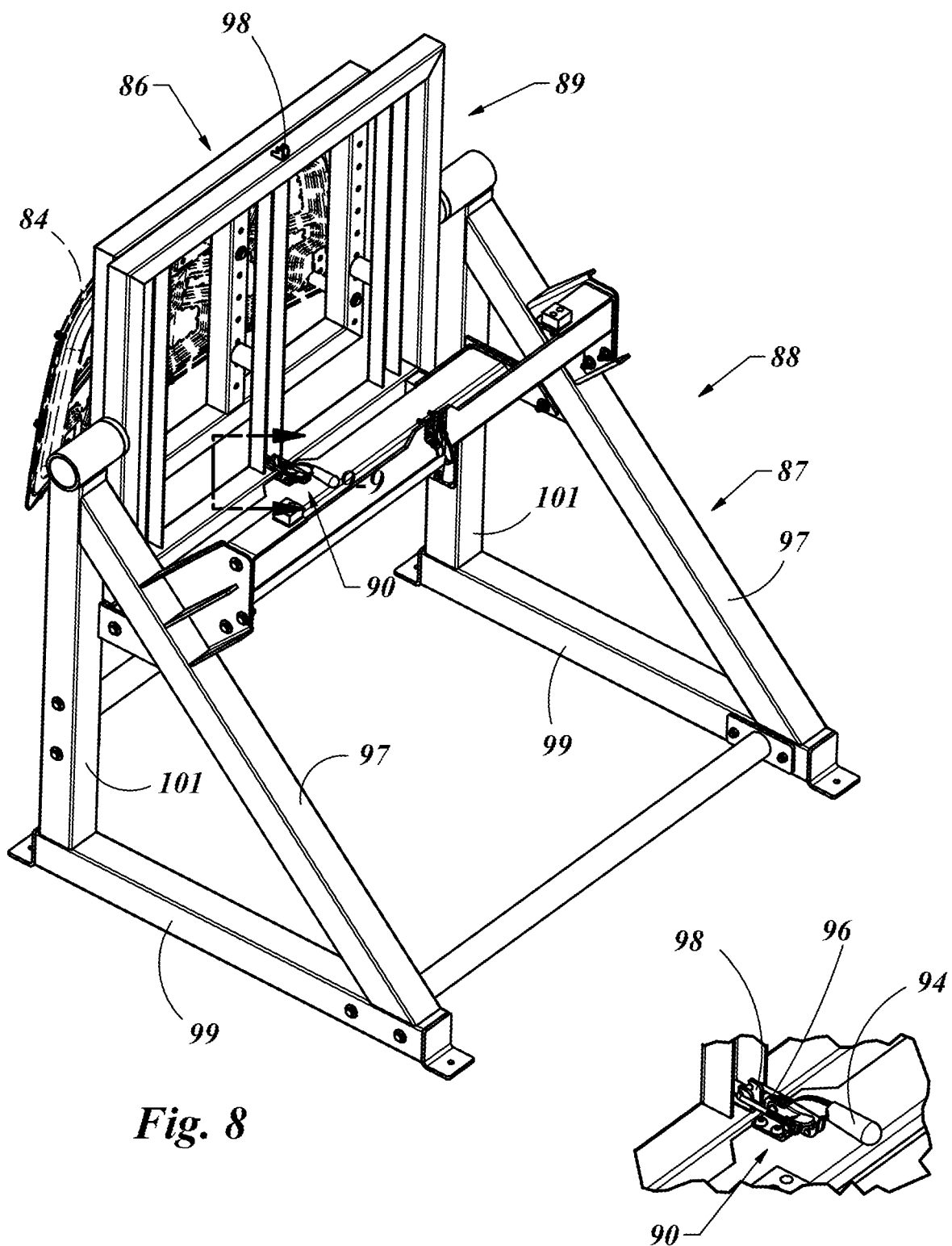
FIG. 8 is a front right view of the body element support of FIG. 7, shown with a body element table locked in a vertical position.
FIG. 9 is a detail view of a locking mechanism of the body element support cut along line 9-9 in FIG. 8.

The body element support 88 may include a rotating portion 89 with one or more locking mechanisms 90, as shown in FIGS. 8-9, to allow the body element support 88 to be locked in a horizontal or vertical position. Any number of embodiments of the locking mechanism 90 may be used. Here an over center clevis lock 92 that is secured to the body element support 88 is shown, the over center lock may include an articulating handle 94. The clevis bar 96 may be received by a lock stud 98 on the rotating portion 89, whereby when the articulating handle 94 is actuated, the clevis bar 96 draws the lock stud 98 to the body element support 88, locking the rotating portion 89 to the support base 87 in a predetermined position. Using two locking mechanisms 90, the rotating portion 89 may be locked in two different positions, such as horizontal and vertical.

Figure 10:
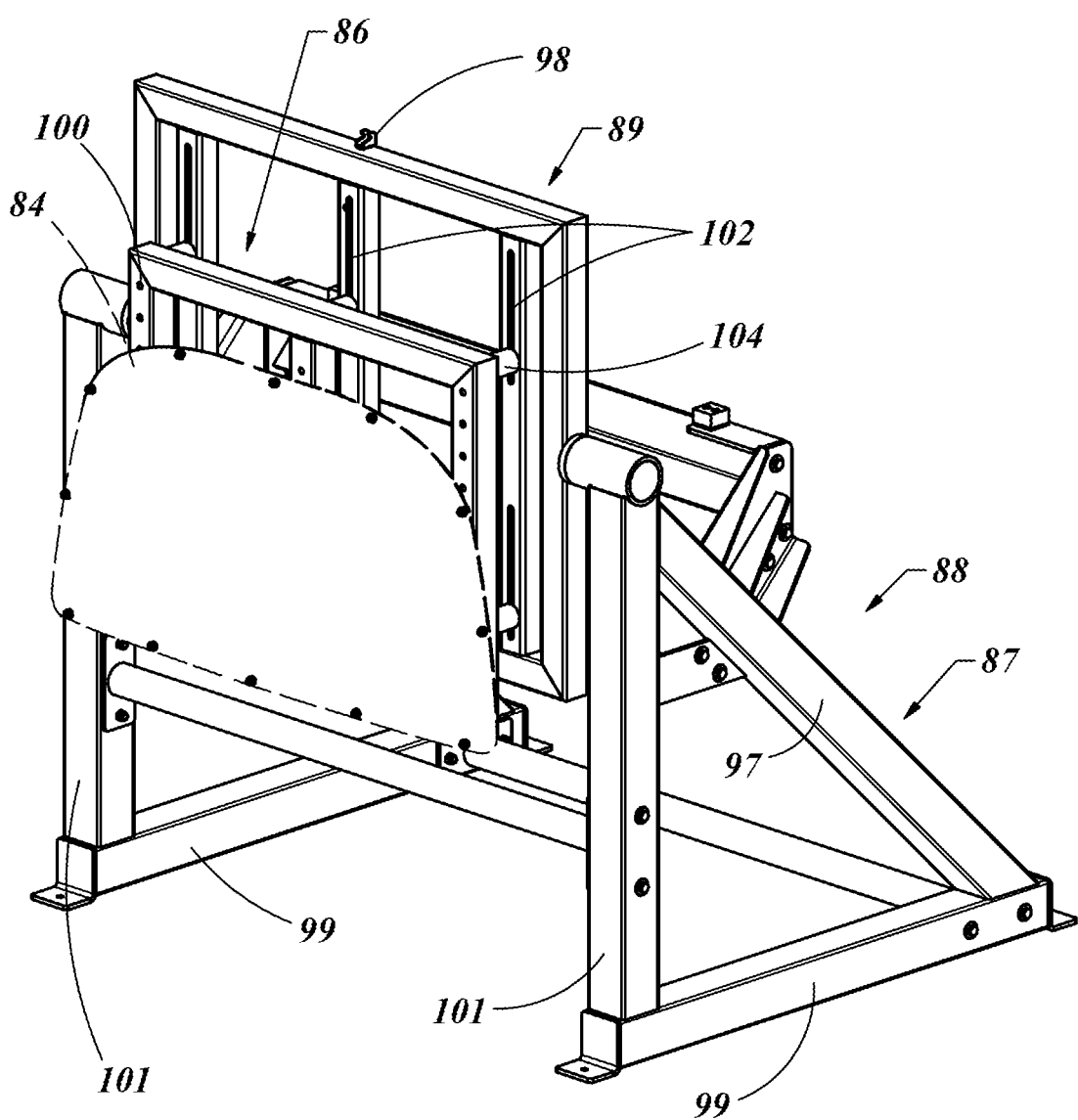
FIG. 10 is a rear right view of the body element support as shown in FIG. 8, shown with the vehicle body element in a lowered position.

The body element support 88 as shown in FIGS. 8, 10 and 110 show the rotating portion 89 in a vertical position. This is the basis for the preferred embodiment of the support base 87 as shown here, which may include a pair of rear legs 97, which may be angled to create a longer and more stable base member 99 while the front legs 101 may be vertical. The front legs 101 may be positioned adjacent to a front portion of the rotating portion 89 when the rotating portion 89 is in the substantially vertical position. The advantage is the vehicle body element 84 may then be positioned in front of the front legs 101 with no obstruction presented by the front legs 101 to a user to access the vehicle body element 84. A traditional "A-frame" base, with the front legs 101 and the rear legs 97 angled to the base member 99 may provide a restricted access to the vehicle body element 84 when in this vertical position. One of the stated purposes of the body element support 88 is to provide a stable support for the vehicle body support 84 that realistically represents the location and position of the vehicle body element 84 if it were on a vehicle. By placing the front legs 101 vertically and having the vehicle body element 84 positioned outside of the structure of the body element support 88, the vehicle body element 84 more accurately represents that part as it may be as part of a vehicle, thus creating a more accurate teaching environment for a PDR student.

Figure 11:
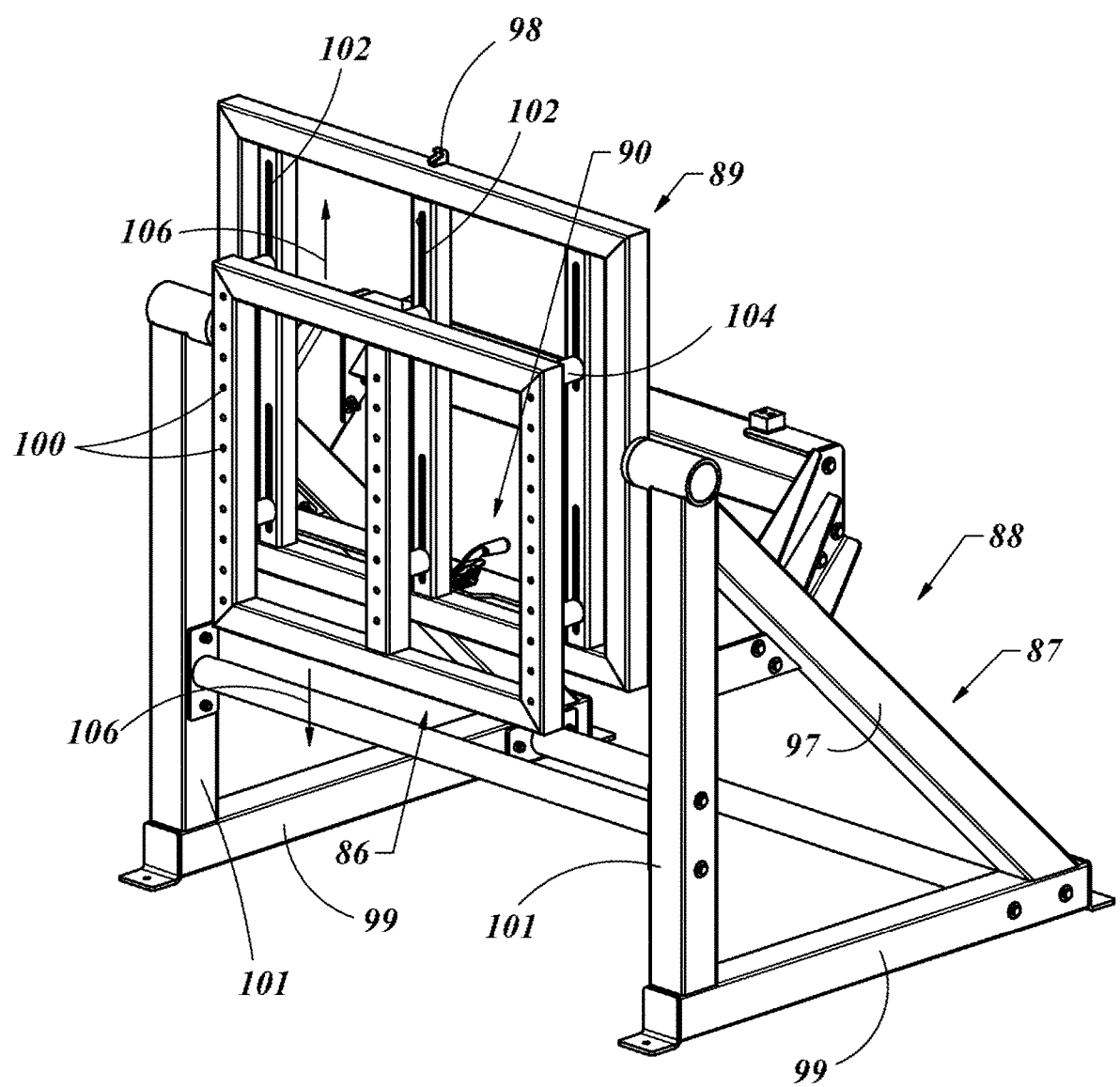
FIG. 11 is a rear right view of the body element support of FIG. 10, shown without the vehicle body element.

The body element support 88, with the body element table 86 locked in a vertical position, is shown with a vehicle body element 84 in FIG. 10 and without the vehicle body element 84 in FIG. 11. The intended purpose of the body element support 88 is to provide a representation of an auto body while supporting a vehicle body element 84 in a relative position that is representative of the physical position in space of that particular vehicle body element 84 if it were on a vehicle. By doing so, a more realistic environment may be created to test the PDR students for different levels of PDR proficiency. As noted, one of the common parts a PDR technician may encounter is a quarter panel or door. The bottom of either of these parts may be fairly close to the ground, or not, depending on the vehicle. To allow for this variation, the vehicle body element 84 may be attached to the body element table 86 by any number of the mounting holes 100 in the body element table 86.

In addition, the body element table 86 may move with the rotating portion 89 of the body element support 88 by way of slots 102 in the rotating portion 89 of the body element support 88 which may align with table studs 104 on the body element table 86. The table studs 104 may be coupled to the rotating portion 89 of the body element support 88 by way of a fastener (not shown) that passes through the slots 102 and into the table studs 104. When the fasteners are loosened, the body element table 86 may move relative to the rotating portion 89 of the body element support 88, as shown by arrows 106, and as limited by the slots 102. When a desired height of the body element table is achieved, the fasteners may be tightened and the body element table 86 may now be locked in a set position as well as any vehicle body element 84 attached to the body element table 86. This process may allow the user to adjust the height of the vehicle body element 84 relative to the ground, providing a realistic placement of the vehicle body element 84 in space.

With reference to FIGS. 12-13, the body element table 86 in FIG. 11 has been removed and replaced with a different mounting element, such as more than one standoff 108 in FIG. 13. In this disclosure, the mounting element may refer to one or more standoffs 108 or a body element table 86. An individual standoff 108 is shown in FIG. 12 with the components of the standoff 108 separated for clarity. The standoff 108 in FIG. 12 may include a standoff extension 110 with an extension shaft 112 and an extension tab 114 secured to one end of the extension shaft 112. The extension tab 114 may include an elongate slot 116 to enable a fastener to extend through the elongate slot 116, thereby providing an adjustable means of securing a vehicle body element 84 (FIG. 10) to the standoff 108.

The standoff extension 110 may be received by the standoff receiver 118. The standoff receiver 118 may include a locking pin assembly 120 with a lock pin 122 that may engage any one of a plurality of extension shaft holes 124 in the extension shaft 112. This may provide a means of vertical adjustment of the standoff 108 in that the dimension from the top of the extension tab 114 to the bottom of the standoff receiver 118 may be securely altered by pulling on the pin knob 126, which may be secured to the lock pin 122. Pulling the pin knob 126 away from the standoff receiver 118 may compress the pin spring 128 while it displaces a distal end of the lock pin 122, removing it out of one of the extension shaft holes 124. The standoff extension 110 may then be able to alter in position relative to the standoff receiver 118, thereby altering the height of the standoff 108. When a desired height is reached, the pin knob 126 may be released by the user and the lock pin 122 may be biased toward the standoff extension 110 by way of the pin spring 128, wherein a portion of the lock pin 122 may be received by an extension shaft hole 124, securing the standoff 108 at a set length.

As shown in FIG. 13, more than one standoff 108 may be coupled to the body element support 88. This may be accomplished by positioning the standoff 108 at the slot 102 by the rotating portion 89 of the body element support 88. A screw knob 130 may have a threaded portion pass through the slot 102 in the rotating portion 89 and the threaded portion of the screw knob 130 may then be received by a threaded hole in a receiver base 132 of the standoff receiver 118. This may allow for rotational adjustment of the standoff 108 about a long axis of the screw knob 130 as well as a linear adjustment of the standoff 108 along the slot 102 in the rotating portion 89 of the body element support 88. Add to that the fact that any reasonable number of standoffs 108 may be coupled to the rotating portion 89 of the body element support 88 and the height adjustment of each standoff 108 may be adjusted and the use of an elongate slot 116 in the extension tab 114 of each standoff 108 may also be used. The result are limitless adjustment capabilities of the standoffs 108 on the rotating portion 89 of the body element support 88 to securely support a wide variety of shapes of vehicle body elements 84.

The foregoing detailed description of the present invention is provided for purpose of illustration, and it is not intended to be exhaustive or to limit the invention to the particular embodiment shown. The embodiments may provide different capabilities and benefits, depending on the configuration used to implement key features of the invention.

What is claimed is:

1. A vehicle body dent system, comprising:
    an impactor including a ram supported by a dent impactor frame, the ram also connected to a carriage that articulates with the dent impactor frame;
    an impactor head connected to the ram and guided by the carriage;
    a body element support including a rotating portion moveably coupled to a support base; and
    a mounting element movably coupled to the rotating portion of the body element support, the mounting element including at least one support adapted to couple to a vehicle body element, thereby fixing the vehicle body element to the body element support and holding the vehicle body element stable as the impactor head strikes the vehicle body element and denting the vehicle body element.

2. The vehicle body dent system according to claim 1, wherein the mounting element is comprised of a body element table that is adjustably mounted to the body element support by use of a slot in the body element support.

3. The vehicle body dent system according to claim 1, wherein the mounting element is comprised of more than one standoff adjustably mounted to the body element support by use of a slot in the body element support.

4. The vehicle body dent system according to claim 3, wherein the standoff is comprised of a standoff extension with an extension tab on a first end, the extension tab including an elongate slot provided for mounting of the body element to the standoff.

5. The vehicle body dent system according to claim 4, wherein the standoff further includes a standoff receiver and a locking pin assembly, the standoff extension being received by the standoff receiver in more than one position and locked in place by the locking pin assembly, whereby the standoff is configured to be adjusted in length and locked in place by the locking pin assembly.

6. The vehicle body dent system according to claim 1, wherein the rotating portion of the body element support is separately positioned horizontally and vertically when the support base is mounted to a horizontal surface.

7. The vehicle body dent system according to claim 6, further comprising a pair of locking mechanisms, a first of the pair of locking mechanisms securing the rotating portion of the body element support in a horizontal position and a second of the pair of locking mechanisms securing the rotating portion of the body element support in a vertical position, wherein a vehicle body element coupled to the body element support is configured to be secured in a vertical or horizontal orientation.

8. The vehicle body dent system according to claim 1, further comprising a dent impactor cart with a lift mechanism coupled to the dent impactor.

9. The vehicle body dent system according to claim 8, wherein the lift mechanism includes a four-bar linkage so that vertical displacement of the dent impactor relative to the dent impactor cart maintains a consistent vertical orientation.

10. The vehicle body dent system according to claim 1, wherein the ram is a pneumatic cylinder.

11. The vehicle body dent system according to claim 1, wherein the carriage includes a carriage weight used to increase kinetic energy of the impactor head as the impactor head moves when driven by the ram.

12. The vehicle body dent system according to claim 1, further comprising a dent impactor cart supporting the dent impactor and a lift mechanism providing vertical displacement of the dent impactor relative to a portion of the dent impactor cart.

13. A method of producing conditioned vehicle body elements and testing, comprising:
    providing a vehicle body element;
    providing an impactor including:
        a ram supported by a dent impactor frame, the ram also connected to a carriage that articulates with the dent impactor frame;
        an impactor head connected to the ram and guided by the carriage;
        a body element support including a rotating portion moveably coupled to a support base; and
        a mounting element movably coupled to the rotating portion of the body element support, the mounting element including at least one support adapted to couple to a vehicle body element, thereby fixing the vehicle body element to the body element support;
    positioning the vehicle body element on the body element support in a horizontal orientation;
    placing an impactor head on the ram of the impactor and charging the ram to a specific level of potential energy;
    lowering the dent impactor so a frame base of the dent impactor is adjacent to the vehicle body element;
    releasing the ram causing the impactor head to strike the vehicle body element, creating a dent of a repeatable size and depth in the vehicle body element, thereby creating a conditioned vehicle body element; and
    using the conditioned vehicle body element as test material to evaluate a skill of a user tasked with removing the dent in the conditioned vehicle body element.

14. The method of producing conditioned vehicle body elements and testing according to claim 13, further comprising:
    removing the impactor from the immediate area of the vehicle body element.

15. A vehicle body dent system, comprising:
    a body element support including a rotating portion with at least one slot, the rotating portion being movably coupled to a support base;
    at least two locking mechanisms coupled to the support base, whereby the body element support is configured to have the rotating portion locked in a vertical orientation or in a horizontal orientation relative to the support base; and a mounting element including a means of attachment to a vehicle body element, the mounting element being releasably coupled to the rotating portion at the at least one slot, allowing the mounting element to be secured to the body element support in more than one location, whereby when the vehicle body element is secured to the body element support, the vehicle body element is positioned in a horizontal position or a substantially vertical position;

wherein the mounting element is comprised of more than one standoff adjustably mounted to the body element support by use of the at least one slot in the rotating portion of the body element support; and wherein each of the one or more standoff is comprised of a standoff extension with an extension tab on a first end, the extension tab including an elongate slot provided for mounting of the body element to the standoff.

16. The vehicle body dent system according to claim 15, wherein the mounting element is comprised of a body element table that is adjustably mounted to the body element support by use of the at least one slot in the rotating portion of the body element support.

17. The vehicle body dent system according to claim 15, wherein the standoff further includes a standoff receiver and a locking pin assembly, the standoff extension being received by the standoff receiver in more than one position and locked in place by the locking pin assembly, whereby the standoff is configured to be adjusted in length and locked in place by the locking pin assembly.

18. The vehicle body dent system according to claim 15, wherein the support base includes a substantially vertical front leg positioned adjacent to a front portion of the rotating portion when the rotating portion is in the substantially vertical position, whereby the substantially vertical front leg allows unobstructed access to the vehicle body element while coupled to the body element support.

* * * * *